(12) United States Patent
Harrington et al.

(10) Patent No.: US 10,876,254 B2
(45) Date of Patent: Dec. 29, 2020

(54) CHEMICAL EFFICIENCY INCREASE IN PAPERMAKING PROCESS

(71) Applicant: SOLENIS TECHNOLOGIES, L.P., Wilmington, DE (US)

(72) Inventors: John C. Harrington, Newark, DE (US); Mingxiang Luo, Hockessin, DE (US); Davit E. Sharoyan, Hockessin, DE (US); Sujan Singh, Malvern, PA (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 70 days.

(21) Appl. No.: 16/149,635

(22) Filed: Oct. 2, 2018

(65) Prior Publication Data
US 2019/0100875 A1    Apr. 4, 2019

Related U.S. Application Data

(60) Provisional application No. 62/567,524, filed on Oct. 3, 2017.

(51) Int. Cl.
*D21C 11/00* (2006.01)
*D21C 9/00* (2006.01)
*D21C 5/00* (2006.01)

(52) U.S. Cl.
CPC .......... *D21C 11/0078* (2013.01); *D21C 5/005* (2013.01); *D21C 9/005* (2013.01); *D21C 11/0007* (2013.01)

(58) Field of Classification Search
None
See application file for complete search history.

(56) References Cited

U.S. PATENT DOCUMENTS

| | | | |
|---|---|---|---|
| 5,578,168 A | 11/1996 | Burdick et al. | |
| 6,083,348 A * | 7/2000 | Auhorn | D21F 1/08 162/164.6 |
| 6,939,437 B1 | 9/2005 | Hill, Jr. et al. | |
| 8,454,798 B2 | 6/2013 | Ban et al. | |
| 9,663,899 B2 * | 5/2017 | Gu | D21D 1/20 |
| 2011/0253333 A1 | 10/2011 | Ban et al. | |
| 2012/0202941 A1 | 8/2012 | Broecher et al. | |
| 2014/0116635 A1 | 5/2014 | Porto et al. | |
| 2017/0218570 A1 | 8/2017 | Gu et al. | |

OTHER PUBLICATIONS

Smook, Gary A., Handbook for Pulp and Paper Technologists, 2nd ed, Angus Wilde Publications, 1992, pp. 207-208. (Year: 1992).*
ISA/US, International Search Report and Written Opinion issued in Int. Appl. No. PCT/US2018/053916 dated Nov. 30, 2018.

* cited by examiner

*Primary Examiner* — Dennis R Cordray
(74) *Attorney, Agent, or Firm* — Lorenz & Kopf, LLP

(57) ABSTRACT

A method of increasing chemical efficiency of chemical additives in a papermaking system includes the steps of providing thick stock pulp comprising soluble lignin, process water, and at least about 2% by weight of cellulosic fiber based on total weight of thick stock pulp, and adding at least one laccase enzyme and at least one organic polymer to the thick stock pulp to reduce the amount of soluble lignin therein. The organic polymer is chosen from cationic polymers, non-ionic polymers and combinations thereof.

20 Claims, 4 Drawing Sheets

CHEMICAL EFFICIENCY INCREASE IN PAPERMAKING PROCESS

CROSS-REFERENCE TO RELATED APPLICATIONS

This application claims priority to U.S. Provisional Application Ser. No. 62/567,524, filed on Oct. 3, 2017, which is hereby incorporated in its entirety by reference.

FIELD OF THE DISCLOSURE

The present disclosure relates to a method for increasing efficiency of chemical additives in papermaking systems. More specifically, the method reduces an amount of soluble lignin in the process water of the papermaking systems though use of a laccase enzyme and a second component.

BACKGROUND

The proposed solution addresses the needs of the papermakers to maximize the efficiency of chemical additives in various systems such as highly or fully closed recycled linerboard mills, minimize fresh water consumption, and minimize the effluent discharge. The problem with declines in chemical efficiency of additives is universal. The scarcity of fresh water sources and ever increasing costs for fresh water use and effluent discharge drive papermakers in reducing fresh water consumption and recycling process water. Many recycle linerboard (RLB) mills today consume 5 m$^3$ or less fresh water per 1 ton paper produced.

The amounts of dissolved impurities in water can grow exponentially and cause many problems in paper production. The problems include formation of deposits, increase of smell, and high levels of VFA, COD and conductivity. Increased levels of dissolved and colloidal components harm the efficiency of chemical additives e.g. strength, retention and drainage polymers, sizing agents etc. As a result, papermakers have to increase the consumption of chemical additives. However, at some point, an increase in polymer load does not help in reaching the desirable performance, especially in fully closed paper mills.

Virgin linerboard mills though consume more fresh water than those of recycle linerboard mills, still face the same issues with reduced chemical efficiency. In many virgin linerboard mills chemical additives do not function well and in some cases they do not function at all.

Efficiency of chemical additives such as retention and drainage polymers, dry strength agents, sizing agents, and waste water treatment polymers can increase with removal of anionic trash and more specifically with removal of soluble lignin species.

Lignin, in addition to cellulose and hemicellulose, is one of main constituents of wood. Lignin is a natural, highly aromatic and hydrophobic polymer. For the production of printing grade paper, most of the lignin gets disintegrated and removed from cellulose by Kraft pulping. Additional amounts of lignin are further reduced by series of bleaching and washing stages. However, for production of packaging paper grades, other pulp sources are used. These include virgin pulp, mechanical pulps, semi-chemical mechanical pulps, and recycled fibers such as OCC (old corrugated containers), and the like. These lower grade pulps may include significant amounts of lignin.

Papermakers have used polymers or enzymes and their combinations to improve the quality of produced paper e.g. dry strength polymer. For example, U.S. Pat. No. 9,663,899 B2 describes compositions comprising laccase, lipase and cationic fixative polymer and optionally a laccase activator for papermaking applications. The patent teaches the increase in dry strength by the application of enzymes and polymer to the lignocellulosic fiber.

U.S. Pat. No. 8,454,798 B2 describes a method for making paper or paper board by applying a composition containing enzyme and cationic coagulant to papermaking pulp prior to paper forming to typically improve drainage, retention, or both. The primary enzyme is cellulase. Other enzymes used are hemicellulose, pectinase, b-glucanase, CMC-ase, amylase, glucosidase, galactosidase, lipase, protease, laccase, or combinations thereof. Cationic coagulant includes both cationic organic polymeric coagulants and inorganic cationic coagulants.

US 2014/0116635 A1 describes the application of enzymes and polymers including at least one cationic water-soluble polymer and an amphoteric water-soluble polymer or both to a papermaking pulp. The list of enzymes includes cellulase and laccase or both. The list of polymers includes glyoxylated polyacrylamide (GPAM), polyvinylamine (PVAm), decarboxylated polyacrylamide, or a dimethylamine-epichlorohydrin (EPI-DMA) or combinations thereof. The outcome of the enzyme-polymer treatment is increase in dry strength measured by ring crush test (RCT) and corrugating medium test (CMT).

The prior art describes compositions or applications for the improvements in lignocellulosic paper quality. The prior art deals with residual lignin and/or other contaminants present in the fiber or on the surface of the fiber. No prior art addresses issues with process water and the effects of process water on papermaking processes. The efficiency of chemical additives will suffer regardless of the presence of contaminants in the fiber if the quality of process water is compromised.

Moreover, the presence of soluble lignin fragments in process water is quite problematic due to the accumulation of significant fractions of low molecular weight lignin species. The smaller soluble lignin fragments present in mill process water do not have enough affinity for cellulose fibers and hence continue to circulate in mill water systems. Accordingly, there remains an opportunity for improvement.

BRIEF SUMMARY

This disclosure addresses the issue of soluble dissolved colloidal lignin in mill process waters via an enzymatic and polymeric approach. This disclosure more specifically provides a method of increasing chemical efficiency of chemical additives in a papermaking system. The method includes the steps of providing thick stock pulp comprising soluble lignin, process water, and at least about 2% by weight of cellulosic fiber based on total weight of thick stock pulp, and adding at least one laccase enzyme and at least one organic polymer to the thick stock pulp to reduce the amount of soluble lignin therein. Moreover, the organic polymer is chosen from cationic polymers, non-ionic polymers and combinations thereof.

This disclosure also provides an additional method of increasing chemical efficiency of chemical additives in a papermaking system. This method includes the steps of providing thick stock pulp comprising soluble lignin, process water, and at least about 2% by weight of cellulosic fiber based on total weight of thick stock pulp, and adding at least one laccase enzyme and at least one inorganic coagulant to the thick stock pulp to reduce the amount of soluble lignin therein.

DETAILED DESCRIPTION

Figure 1:
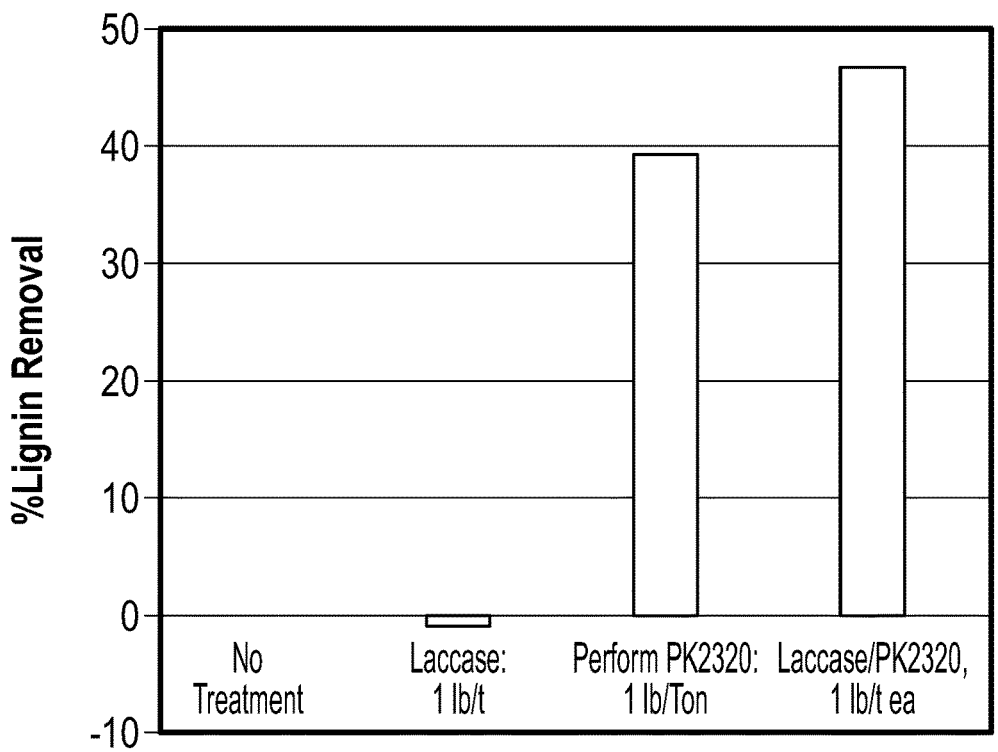
FIG. 1 is a graph depicting the removal of soluble lignin by application of laccase, Perform PK2320 polymer product and their combinations.

A method of removing soluble lignin in a papermaking system is disclosed. The novel method allows for increase in chemical efficiency of papermaking additives including strength additives, retention and drainage polymers, sizing agents and others. The present disclosure discloses a new method for soluble lignin removal for thick stock pulp in papermaking process. The method includes adding a laccase enzyme to the thick stock pulp along with a second component which may be, for example, a cationic or non-ionic polymer and/or an inorganic coagulant. The method may include adding a cationic or non-ionic polymer to the thick stock pulp of a papermaking system in highly closed papermaking systems. Lignin reduction from thick stock pulp and its fixation onto fiber results in significant improvements of chemical additives efficiency including those of strength, sizing, retention and drainage agents.

With increasing degree of water closure, either due to regulatory restrictions or water scarcity, the efficiency of chemical additives declines. The decrease in chemical efficiency, and in some cases a complete lack of performance of polymeric additives, is generally attributed to organic contaminants, loosely defined species in the mill process waters collectively referred to as anionic trash. The anionic trash typically includes of extremely short fibers called fines, degraded starch, degraded or modified chemical additives such as polymers as well as soluble dissolved colloidal lignin. These components affect the performance of chemical additives, in particular cationic polymers, differently. Using a model white water system, based upon the compositional analysis of several commercial recycled, virgin Kraft and NSSC paper mills, the applicants investigated the effect of several troublesome components on cationic polymers. Lignin, although not the most prevalent species in mill process waters, showed the most adverse impact on chemical efficiency.

Soluble lignin is a very troublesome component among dissolved and colloidal components of papermaking process water. It was found that soluble lignin has a range of molecular weights. The tendency to absorb on fiber and be removed from the system declines with reduction in molecular weight (J. Sundin and N. Hartler in Nordic Pulp and Paper Research Journal, v. 15 No 4, 2000, p 306-312 conclude that low molecular weight lignin (<1000 Da) does not precipitate at all). As a result, low molecular weight soluble lignin species get accumulated in process water over time and over increased number of cycles resulting in lowered performance of polymeric additives.

The disclosure addresses the issue of soluble lignin in thick stock pulp via an enzymatic and polymeric approach. Soluble lignin can be removed from the papermaking process water by a treatment comprising addition of laccase and non-ionic and/or cationic polymers to the thick stock pulp.

The non-ionic polymers useful in the disclosure include, but are not limited to, poly-oxazoline, polyethylene oxide (PEO), copolymers of polyethylene oxide or polypropylene oxide (PO), copolymers of polyethylene oxide and polypropylene oxide (EO/PO), polyvinylpyrrolidone, polyethylenimines (PEI) and/or their combinations. The PEO can be a homo-polymer of ethylene oxide, or a copolymer of ethylene oxide with propylene oxide and/or butylene oxide. A homopolymer of polyethylene oxide is the most typical. Examples of such products are available as dry powder products from Solenis LLC (Wilmington, Del.) as Perform PB 8714 and Dow Chemical (Midland, Mich.) as Ucarfloc 300, 302, 304, and 309. The PEO homopolymer is also available as a slurry, where the PEO is dispersed in a medium. The medium can be any one or more of ethylene glycol, propylene glycol, poly(ethylene glycol), poly(propylene glycol), glycerol, and the like and or their combinations. Examples of a PEO slurry include Zalta NIF 3000 from Solenis LLC (Wilmington, Del.).

The non-ionic or cationic polymers useful in the present disclosure can be of Formulas I or II or III.

$$\text{—}[\text{B}]\text{—} \qquad \text{(Formula I)}$$

$$\text{—}[\text{B-co-C}]\text{—} \qquad \text{(Formula II)}$$

$$\text{—}[\text{C}]\text{—} \qquad \text{(Formula III)}$$

B represents one or more different nonionic repeat units formed after polymerization of one or more nonionic monomers.

C represents one of more different cationic repeat units formed after polymerization of one or more cationic monomers.

The nonionic polymer segment B in Formulas I and II is a repeat unit formed after polymerization of one or more nonionic monomers. Exemplary monomers encompassed by B which are useful for the present disclosure include, but are not limited to, acrylamide; methacrylamide; N-alkylacrylamides, such as N-methylacrylamide; N,N-dialkylacrylamide, such as N,N-dimethylacrylamide; methyl methacrylate; methyl acrylate; acrylonitrile; N-vinyl methylacetamide; N-vinylformamide; N-vinylmethyl formamide; vinyl acetate; N-vinyl pyrrolidone and mixtures of any of the foregoing. The disclosure contemplates that other types of nonionic monomer can be used, or more than one kind of non-ionic monomer can be used. Preferable nonionic monomers used are acrylamide; methacrylamide, N-vinylformamide.

The cationic polymer segment C in Formula II and III is the repeat unit formed after polymerization of one or more cationic monomers. Exemplary monomers encompassed by C which are useful for the present disclosure include, but are not limited to, cationic ethylenically unsaturated monomers such as the diallyldialkylammonium halides, such as diallyldimethylammonium chloride; the (meth)acrylates of dialkylaminoalkyl compounds, such as dimethylaminoethyl (meth)acrylate, diethylaminoethyl (meth)acrylate, dimethyl aminopropyl (meth)acrylate, 2-hydroxydimethyl aminopropyl (meth)acrylate, aminoethyl (meth)acrylate, and the salts and quaternaries thereof; the N,N-dialkylaminoalkyl(meth) acrylamides, such as N,N-dimethylaminoethylacrylamide, and the salt and quaternaries thereof and mixtures of the foregoing. Most typical are diallyldimethylammonium chloride (DADMAC) and dimethylaminopropyl (meth)acrylamide (DIMAPA), dimethylaminoethyl (meth)acrylate (ADAME) and the salt and quaternaries thereof and mixtures of the foregoing.

Another method to produce the cationic polymer of structure II is by polymerization of the monomer(s) followed by hydrolysis. The level of hydrolysis can be expressed as "% hydrolysis" or "hydrolysis %" on a molar basis. A hydrolyzed polymer can thus be described by as "% hydrolyzed." Moreover the level of hydrolysis can be approximated. For the purposes of applicants' disclosure, a poly (vinylamine) that is referred to as "50% hydrolyzed" means from about 40 to about 60% hydrolyzed. Likewise, a poly (vinylamine) that is about 100% hydrolyzed means from about 80 to about 100% hydrolyzed. The hydrolysis reaction results in the conversion of some or all of the monomer(s) to amines, as controlling the hydrolysis reaction can vary the resultant percentage of monomers having amine functionality. Poly(vinylamine)s are useful in the present disclosure. Examples of monomers used to make a poly(vinylamine) include, but are not limited to, N-vinylformamide, N-vinyl methyl formamide, N-vinylphthalimide, N-vinylsuccinimide, N-vinyl-t-butylcarbamate, N-vinylacetamide, and mixtures of any of the foregoing. Most typical are polymers prepared by the hydrolysis of N-vinylformamide. In the case of copolymers, nonionic monomers, such as those described above, are the typical comonomers. Alternatively, poly(vinylamine) can be prepared by the derivatization of a polymer. Examples of this process include, but are not limited to, the Hofmann reaction of polyacrylamide. It is contemplated that other synthetic routes to a poly(vinylamine) or polyamine can be utilized.

Polymer dispersions such as described in U.S. Pat. No. 7,323,510, which is expressly incorporated herein by reference in various non-limiting embodiments, can be used in the present disclosure. For example, a dispersion containing (i) a high molecular weight cationic polyacrylamide with a weight average molecular weight of greater than about 1,000,000, and (ii) a highly charged (derived from greater than about 50%, typically about 60% cationic monomers) low molecular weight cationic dispersant polymer with a molecular weight of between about 100,000 and about 500,000 can be used in the disclosure. Typical cationic monomers for the components of the dispersion are those listed for polymer segment C. In various non-limiting embodiments, all values and ranges of values including and between those set forth above are hereby expressly contemplated for use herein.

The molar percentage of B:C of nonionic monomer to cationic monomers of Formula II may fall within the range of about 99:1 to about 1:99, or about 80:20 to about 20:80, or about 75:25 to about 25:75 or about 40:60 to about 60:40 or about 99:1 to 50:50, and most typical are about 99:1 to about 90:10 where the molar percentages of B and C add up to about 100%. It is to be understood that more than one kind of nonionic or cationic monomer may be present in Formula II or III. In various non-limiting embodiments, all values and ranges of values including and between those set forth above are hereby expressly contemplated for use herein.

The cationic or non-ionic polymers used in the disclosure can be manufactured and supplied to the end user as a dry or granular powder, an aqueous solution, a dispersion, or an inverse emulsion.

The molecular weight of the cationic or non-ionic polymers can be from about 100,000 to about 10 million Da, typically greater than about 250,000. The molecular weight of the cationic or non-ionic polymers can be from about 400,000 to about 10 million Da. Usually higher molecular weight of non-ionic polymer provides more efficient soluble lignin removal. For instance when using non-ionic polymers or dispersion polymers a molecular weight of about 1 million or greater is typical. For highly charged (greater than 60% cationic monomer) cationic polymers (DADMAC or DIMAPA or EPI-DMA) molecular weight can be from about 100,000 to up to about 1,000,000, or typically from about 200,000 to up to about 500,000. Typically for low charged cationic polymers (10 mole percent or less of cationic monomer) molecular weight can be from about 1,000,000 to up to about 10,000,000 Daltons. In various non-limiting embodiments, all values and ranges of values including and between those set forth above are hereby expressly contemplated for use herein.

The non-ionic or cationic polymer dosage can be from 0.01 lbs to 10 lbs. of polymer solids per ton of oven dried pulp (e.g. dry furnish solids) or about 0.01 to about 10, or about 0.05 to about 5, or about 0.1 to about 3 lbs, or about 0.1 to about 2 lbs. of polymer solids (e.g. active organic polymer) per ton of oven dried pulp (e.g. dry furnish solids). In various non-limiting embodiments, all values and ranges of values including and between those set forth above are hereby expressly contemplated for use herein.

It was found that soluble lignin removal from thick stock pulp can be synergistically enhanced by the addition of laccase enzyme and non-ionic or cationic polymers to the thick stock pulp. It is theorized that laccase catalyzes polymerization and oxidative coupling of low molecular weight soluble lignin into larger molecular weight species thus making soluble lignin complexation and removal by cationic or non-ionic polymers more efficient.

Soluble lignin removal may be further enhanced by combining laccase with addition of inorganic cationic coagulants like polyaluminum chloride, alum (aluminum sulfate), aluminum chlorosulfate, aluminum chlorohydrate, ferric(III) chloride, ferric(III) sulfate, iron (II) chloride, iron (II) sulfate, polyferrous sulfate, any other aluminum or iron based cationic coagulant known to those of skill in the art. Inorganic cationic coagulants addition dosage can be from about 0.01 lb to about 12 lb of dry solids per dried fiber solids, or more specifically from about 0.05 to about 6 lb of dry solids per dried fiber solids. In various non-limiting embodiments, all values and ranges of values including and between those set forth above are hereby expressly contemplated for use herein.

Laccase is an enzyme from the oxidoreductase family which is known to catalyze oxidation and/or crosslinking of soluble lignin and other aromatic structures. One may hypothesize that polymerization of smaller soluble lignin fragments with an oxidoreductase such as Laccase would promote binding of higher molecular weight soluble lignin with cellulose fibers leading to an overall reduction of soluble lignin in the thick stock pulp. Additionally, it can be postulated that higher molecular weight soluble lignin will also have higher affinity for cationic polymers and therefore co-opting Laccase and a cationic or non-ionic polymer may provide synergistic increase in efficiency of soluble lignin removal from mill waters.

Laccase used in this application can be of microbial, fungal or plant origin and can be used with or without mediator(s). Mediators are compounds that promote or keep efficiency of enzymes. For better efficiency it needs to have a presence and influx of oxygen to catalyze the oxidation and crosslinking of aromatic structures, those of soluble lignin related in particular. Laccase addition dosage can be from about 0.01 lb to about 5.0 lb of product, more specifically from about 0.01 to about 1.0 lb or about 0.1 lb to about 1.0 lb per ton of oven dried pulp (e.g. dry furnish solids), wherein one pound of laccase product is equivalent to about 500,000 LAMU units. 1 LAMU is defined as the amount of enzyme which under standard conditions (pH 7.5, 30° C.) oxidizes 1 mmol syringaldazine per minute. In various non-limiting embodiments, all values and ranges of values including and between those set forth above are hereby expressly contemplated for use herein.

The laccase works most efficiently in a pH range of about 5 to about 9, more typically from about 6 to about 8 and a temperature range of about 15° C. to about 75° C., more typically about 35° C. to about 55° C. In various non-limiting embodiments, all values and ranges of values including and between those set forth above are hereby expressly contemplated for use herein.

Prior art taught that the treatment of synthetic white water and mill water with laccase does not lead to significant reduction in soluble lignin levels (similar trends reported in X. Zhang, Pulp and Paper Canada, 101:3, 2000, p. 59-62). However, the combination of non-ionic or cationic polymers with laccase enzyme removes soluble lignin and fixates onto cellulosic fiber of thick stock pulp. Combining laccase treatment with addition of non-ionic or cationic polymers leads to unexpected enhancement in soluble lignin removal. As hypothesized increase in molecular weight of soluble lignin and soluble lignin species upon laccase treatment creates favorable conditions for soluble lignin fixation with high molecular weight cationic and non-ionic polymers.

Soluble lignin reductions are accompanied with drop in negative Mutek charge of both lab generated or paper mill process waters. Mutek charge is defined as a surface charge of colloid species in the filtrate. Since soluble lignin is one of significant contributors to negative Mutek charge, soluble lignin reductions are expected to reduce negative Mutek charge of process water by at least about −50 μequ/L, possibly by about −100 μequ/L, or by about −200 μequ/L or more.

Soluble lignin reductions in thick stock pulp by laccase/polymer combination treatment results in chemical efficiency improvements. These include but not limited to the efficiency of retention and drainage polymers, strength agents, sizing agents and others.

Soluble lignin reductions in thick stock pulp are expected to have benefits not only in chemical efficiency increase but also in the operations of primary clarifiers, anaerobic and aerobic digester plants, on waste water treatment overall due to removal of species which are hard to oxidize and remove by traditional methods of water remediation. Soluble lignin removal and hence chemical efficiency increase is also expected to reduce fresh water use and water closure increase.

Soluble lignin removal is expected to reduce COD (chemical oxygen demand) of process water and COD of waste water stream, including COD fractions which are harder to oxidize (or reduce) and which often require tertiary treatment with the use of oxidizing agents. That in its turn is expected to make waste water treatment more effective and less expensive.

The soluble lignin can be specifically removed in this manner only using an enzyme such as laccase which specifically modifies soluble lignin and soluble lignin type structures. Enzymes such as cellulase, xylanase, protease, esterase do not provide similar benefits towards soluble lignin removal from the mill process waters.

Enzyme and polymer can be applied simultaneously or in consecutive manner to the thick stock pulp or parts of the papermaking where process water is mixed with cellulosic fiber, i.e. in a thin or thick stock. However the best efficiency is achieved by application of laccase followed by addition of polymer both to a thick stock, e.g. blend chest, machine chest. Thick stock pulp may be defined as a mixture of process water and cellulosic fiber with fiber consistency to be about 2% or higher, e.g. from about 2 to about 3, about 3 to about 4, about 2 to about 4, or about 4, %. Application of enzyme and polymer in a thick stock enables soluble lignin removal onto fiber and thus into finished paper.

The proposed treatment can be found beneficial for polymer additive efficiency increase not only in RLB paper mills which utilize mainly OCC fiber source but also in paper mills utilizing virgin pulp, deinked pulp (DIP), unbleached Kraft pulp (UBSK), mechanical pulps like thermal mechanical pulp (TMP), semi-chemical mechanical pulps like neutral sulfite semi-chemical (NSSC), recovered newspaper, recovered tissue or other fiber sources.

Also provided is a method of increasing efficiency of chemical additives in a papermaking system comprising adding at least one laccase enzyme and at least one inorganic coagulant, to the thick stock pulp to reduce the amount of soluble lignin in the thick stock pulp.

Additional Embodiments

In various embodiments, this provides a method of increasing chemical efficiency of chemical additives in a papermaking system. The method includes the steps of providing thick stock pulp comprising soluble lignin, process water, and at least about 2% by weight of cellulosic fiber based on total weight of thick stock pulp, and adding at least one laccase enzyme and at least one organic polymer to the thick stock pulp to reduce the amount of soluble lignin therein. Moreover, the organic polymer is chosen from cationic polymers, non-ionic polymers and combinations thereof. This method also provides an additional method of increasing chemical efficiency of chemical additives in a papermaking system. This method includes the steps of providing thick stock pulp comprising soluble lignin, process water, and at least about 2% by weight of cellulosic fiber based on total weight of thick stock pulp, and adding at least one laccase enzyme and at least one inorganic coagulant to the thick stock pulp to reduce the amount of soluble lignin therein.

In one embodiment, the organic polymer is cationic. In another embodiment, the cationic polymer has the general formula II: [B co C—], wherein B represents one or more different nonionic repeat units formed after polymerization of one or more nonionic monomers and C represents one of more different cationic repeat units formed after polymerization of one or more cationic monomers. In another embodiment, the molar percentage of B:C of nonionic monomer to cationic monomer of Formula II is about 99:1 to about 1:99, or about 80:20 to about 20:80, or about 75:25 to about 25:75 or about 40:60 to about 60:40 or about 99:1 to about 50:50. In a further embodiment, the molar percentage of B:C of nonionic monomer to cationic monomer of Formula II is about 99:1 to about 90:10. In still another embodiment, the organic polymer has the general formula II: [C—], wherein C represents one of more different cationic repeat units formed after polymerization of one or more cationic monomers. In a further embodiment, the cationic or non-ionic polymer is chosen from cationic polyacrylamides, polyvinylamines, polyethyleneimines, diallyldimethylammonium chloride polymers, trialkylamminoalkyl (meth) acrylamide polymers, epichlorohydrin-dimethylamine copolymers, polyethyleneoxide polymers, polyethyleneoxide/polypropyleneoxide copolymers, poly-oxazolines and combinations thereof. Alternatively, the cationic polyacrylamides is derived from at least one monomer chosen from diallyldimethylammonium chloride, N,N,N-trialkylamminoalkyl (meth)acrylate, N,N,N-trialkylamminoalkyl (meth) acrylamide, epichlorohydrin-dimethylamine and combinations thereof. Moreover, the cationic polymer may include a polyvinylamine, wherein the polyvinylamine is derived from at least one monomer chosen from N-vinylformamide, N-vinyl methyl formamide, N-vinylphthalimide, N-vinyl succinimide, N-vinyl-t-butylcarbamate, N-vinylacetamide, and mixtures of any of the foregoing, wherein typically at least one monomer is N-vinylformamide. In another embodiment, the cationic polymer is a polymer dispersion comprising (i) a high molecular weight cationic polyacrylamide and (ii) a low molecular weight highly changed cationic dispersant polymer. In yet another embodiment, the weight average molecular weight of the non-ionic or cationic polymer is from about 100,000 to about 10 million Da and typically about 400,000 to about 10 million Da. Alternatively, the organic polymer is non-ionic. Moreover, the weight average molecular weight of the non-ionic polymer may be from about 400,000 to about 10 million Da and typically about 1,000,000 to about 10,000,000 Da. In various non-limiting embodiments, all values and ranges of values including and between those set forth above are hereby expressly contemplated for use herein.

In other embodiments, the disclosure provides a method of increasing efficiency of chemical additives in a papermaking system comprising adding at least one laccase enzyme and at least one organic polymer to the thick stock pulp to reduce the amount of soluble lignin in the thick stock pulp; wherein the organic includes polyethyleneoxide polymer with a weight average MW of greater than about 1,000,000 and less than about 10 million daltons. Alternatively, the disclosure provides a method of increasing efficiency of chemical additives in a papermaking system comprising adding at least one laccase enzyme and at least one organic polymer to the p thick stock pulp to reduce the amount of soluble lignin in the thick stock pulp; wherein the organic polymer includes cationic polyacrylamide with a weight average MW of greater than about 200,000 and less than about 10 million daltons. Moreover, the laccase dosage to the thick stock pulp may be from about 0.01 lb to about 5.0 lb of product, more typically from about 0.1 lb to about 1.0 lb per ton of oven dried pulp (e.g. dry furnish solids). In other embodiments, the organic polymer is added to the thick stock pulp in an amount of from 0.01 lbs to 10 lbs. of polymer solids per ton of oven dried pulp (e.g. dry furnish solids) or about 0.01 to about 10, or about 0.05 to about 5, or about 0.1 to about 3 lbs. of polymer solids (e.g. active organic polymer) per ton of oven dried pulp (e.g. dry furnish solids). In still other embodiments, the at least one laccase enzyme and at least one organic polymer are added in a sequential manner to the thick stock pulp, wherein the thick stock pulp may be a slurry of process water and cellulosic fiber with a consistency of about 2% or higher. Alternatively, the at least one laccase enzyme and at least one organic polymer are added in a concurrent manner to the thick stock pulp, wherein the thick stock pulp may be defined as a slurry of process water and cellulosic fiber with a consistency of about 2% or higher. In further embodiments, the organic polymer includes a homopolymer. Alternatively, the organic polymer includes a copolymer. In various non-limiting embodiments, all values and ranges of values including and between those set forth above are hereby expressly contemplated for use herein.

In still other embodiments, the removal of soluble lignin is monitored by reduction in absorbance in UV-VIS spectra at about 280 nm and the reduction in absorbance is about 5% or higher after about 24 hours as compared to the system before the laccase and the cationic or non-ionic polymer were added to the thick stock. Alternatively, the thick stock pulp includes a cellulosic fiber source, wherein the cellulosic fiber source is chosen from OCC, deinked pulp, virgin fiber, mechanical pulp, unbleached Kraft pulp or the mixtures thereof. Still further, the thick stock pulp can include a cellulosic fiber source, wherein the cellulosic fiber source includes recycled paper. In other embodiments, at least one chemical additives in the papermaking system is chosen from retention and drainage polymers, strength agents and sizing agents and combinations thereof. In still further embodiments, COD is reduced by at least about 5% in the process water or waste water streams as compared to the COD compared to the system before the laccase and the cationic or non-ionic polymer were added to the thick stock. Even further, the method may further include addition of inorganic coagulants to the thick stock. In other embodiments, the inorganic coagulants are chosen from aluminum sulfate, aluminum chloride, aluminum chlorohydrate, polyaluminum chloride, polyaluminum sulfate, iron (III) chloride, iron (III) sulfate iron (II) chloride, iron (II) sulfate, polyferrous sulfate, and combinations thereof. In various non-limiting embodiments, all values and ranges of values including and between those set forth above are hereby expressly contemplated for use herein.

This disclosure also provides a method that includes the steps of providing thick stock pulp comprising soluble lignin, process water, and at least about 2% by weight of cellulosic fiber based on total weight of thick stock pulp, and adding at least one laccase enzyme and at least one inorganic coagulant to the thick stock pulp to reduce the amount of soluble lignin therein. In various embodiments, the laccase dosage to the thick stock pulp is from about 0.01 lb to about 5.0 lb of product and more typically from about 0.1 lb to about 1.0 lb per ton of oven dried pulp (e.g. dry furnish solids). In other embodiments, the inorganic cationic coagulant is added to the papermaking system in an amount of from about 0.01 lb to about 12 lb of dry solids per ton of dried fiber solids, or more specifically from about 0.05 to about 6 lb of dry solids per ton of dried fiber solids. In further embodiments, at least one laccase enzyme and at least one inorganic cationic coagulant are added in a sequential manner to the thick stock pulp in the thick stock, wherein the thick stock pulp may be defined as a slurry of process water and cellulosic fiber with a consistency of about 2% or higher. In still other embodiments, the at least one laccase enzyme and at least one the inorganic cationic coagulant are added in a concurrent manner to the thick stock pulp, wherein the thick stock pulp may be defined as a slurry of process water and cellulosic fiber with a consistency of about 2% or higher. Moreover, the removal of soluble lignin may be monitored by reduction in absorbance in UV-VIS spectra at 280 nm and the reduction in absorbance is about 5% or higher after about 24 hours as compared to the system before the laccase and the inorganic cationic coagulant were added to the thick stock. In further embodiments, the thick stock pulp includes a cellulosic fiber source, wherein the cellulosic fiber source is chosen from OCC, deinked pulp, virgin fiber, mechanical pulp, unbleached Kraft pulp or the mixtures thereof. Additionally, the thick stock pulp may include a cellulosic fiber source, wherein the cellulosic fiber source includes recycled paper. In alternative embodiments, at least one chemical additives in the papermaking system is chosen from retention and drainage polymers, strength agents and sizing agents and combinations thereof. In other embodiments, COD is reduced by at least about 5% in the process water or waste water streams as compared to the COD compared to the system before the laccase and the inorganic cationic coagulant were added to the thick stock. Moreover, the inorganic coagulants may be chosen from aluminum sulfate, aluminum chloride, aluminum chlorohydrate, polyaluminum chloride, polyaluminum sulfate, iron (III) chloride, iron (III) sulfate, iron (II) chloride, iron (II) sulfate, polyferrous sulfate, and combinations thereof. In various non-limiting embodiments, all values and ranges of values including and between those set forth above are hereby expressly contemplated for use herein.

In various embodiments, this disclosure provides a method of increasing efficiency of chemical additives in a papermaking system wherein the method includes the step of providing thick stock pulp comprising soluble lignin, process water, and at least about 2% by weight of cellulosic fiber based on total weight of thick stock pulp, and adding at least one laccase enzyme and at least one organic polymer to the thick stock pulp to reduce the amount of soluble lignin therein. Moreover, the organic polymer is chosen from cationic polymers, non-ionic polymers and combinations thereof. In another embodiment, the thick stock pulp includes at least about 3 or 4% by weight of the cellulosic fibers based on a total weight of the process water. In such embodiments, the cellulosic fibers are derived from NSSC pulp, OCC pulp, deinked pulp, virgin fiber, mechanical pulp, unbleached Kraft pulp or combinations thereof. In a further embodiment, the organic polymer is cationic and has the general formula II: [B-co-C] (II) wherein B is one or more nonionic repeat units formed after polymerization of one or more nonionic monomers, C is one or more different cationic repeat units formed after polymerization of one or more cationic monomers, and -co- is indicative of the polymer being a co-polymer of B and C. In another embodiment, a molar percentage of B:C of the nonionic monomer to the cationic monomer of Formula II is about 75:25 to about 25:75. In still another embodiment, the organic polymer has the general formula III: [—C—] wherein C is one or more different cationic repeat units formed after polymerization of one or more cationic monomers. In a further embodiment, the organic polymer is chosen from cationic polyacrylamides, polyvinylamines, polyethyleneimines, diallyldimethylammonium chloride polymers, trialkylamminoalkyl (meth)acrylamide polymers, epichlorohydrin-dimethylamine copolymers, polyethyleneoxide polymers, polyethyleneoxide-polypropyleneoxide copolymers, polyoxazolines, and combinations thereof. In still a further embodiment, the cationic polyacrylamides are derived from at least one monomer chosen from diallyldimethylammonium chloride, N,N,N-trialkylamminoalkyl (meth)acrylate, N,N,N-trialkylamminoalkyl (meth) acrylamide, epichlorohydrin-dimethylamine and combinations thereof. In another embodiment, the cationic polymer includes a polyvinylamine derived from at least one monomer chosen from N-vinylformamide, N-vinyl methyl formamide, N-vinylphthalimide, N-vinyl succinimide, N-vinyl-t-butylcarbamate, N-vinylacetamide, and combinations thereof. In yet another embodiment, the organic polymer is a polymer dispersion comprising (i) a high molecular weight cationic polyacrylamide having a weight average molecular weight of greater than about 1,000,000 g/mol and (ii) a low molecular weight cationic dispersant polymer derived from greater than about 50 wt % of cationic monomers and having a weight average molecular weight of from about 100,000 to about 500,000 g/mol. In an additional embodiment, the weight average molecular weight of the non-ionic or cationic polymer is from about 100,000 to about 10 million Da. In another embodiment, the organic polymer is non-ionic and has a weight average molecular weight of from about 1,000,000 to about 10,000,000 Da. In another embodiment, the organic polymer is a polyethyleneoxide polymer having a weight average molecular weight of greater than about 1,000,000 and less than about 10 million Da. In a further embodiment, the organic polymer is cationic polyacrylamide having a weight average molecular weight of greater than about 200,000 and less than about 10 million Da. In another embodiment, the laccase enzyme is added to the thick stock pulp in an amount of from about 0.1 pound to about 1.0 pound per ton of oven dried furnish solids. In another embodiment, the organic polymer is added to the thick stock pulp in an amount of from about 0.05 to about 5 dry pounds of the organic polymer (e.g. active organic polymer) per ton of dried furnish solids. In a further embodiment, the reduction in the amount of soluble lignin in the thick stock pulp is evidenced by at least a 5% reduction in absorbance in a UV-VIS spectra measured at about 280 nm after 24 hours as compared to process water that is free of the at least one laccase enzyme and the at least one organic polymer. In another embodiment, the process water exhibits a chemical oxygen demand that is reduced by at least about 5% as compared to the chemical oxygen demand of process water that is free of the at least one laccase enzyme and the at least one organic polymer. In a further embodiment, the method includes the step of adding an inorganic coagulant to the thick stock pulp wherein the inorganic coagulant is chosen from aluminum sulfate, aluminum chloride, aluminum chlorohydrate, polyaluminum chloride, polyaluminum sulfate, iron (III) chloride, iron (III) sulfate, iron (II) chloride, iron (II) sulfate, polyferrous sulfate, and combinations thereof. In various non-limiting embodiments, all values and ranges of values including and between those set forth above are hereby expressly contemplated for use herein.

In yet another embodiment, this disclosure provides an additional method of increasing chemical efficiency of chemical additives in a papermaking system. This method includes the steps of providing thick stock pulp comprising soluble lignin, process water, and at least about 2% by weight of cellulosic fiber based on total weight of thick stock pulp, and adding at least one laccase enzyme and at least one inorganic coagulant to the thick stock pulp to reduce the amount of soluble lignin therein. In various embodiments, the inorganic coagulant is chosen from aluminum sulfate, aluminum chloride, aluminum chlorohydrate, polyaluminum chloride, polyaluminum sulfate, iron (III) chloride, iron (III) sulfate, iron (II) chloride, iron (II) sulfate, polyferrous sulfate, and combinations thereof. In various non-limiting embodiments, all values and ranges of values including and between those set forth above are hereby expressly contemplated for use herein.

EXAMPLES

The enzyme laccase (EC 1.10.3.2) used in these studies is commercially available from Solenis LLC (DPC-757 enzyme product). The activity the laccase enzyme product is reported as laccase units based on the rate of oxidation of well-known substrate syringaldazine. One pound of DPC-757 is approximately equivalent to 500,000 LAMU units.

Polymer products used in this testing are Perform PK2320 (water dispersion of cationic polyacrylamide, 28% actives), Hercobond 5475 (10% mole cationic polyacrylamide powder product, 100% active), and Zalta MF 3000 (25% active polyethylene oxide dispersion product) all Solenis LLC products. Addition levels of polymers are given in pounds of active polymer per ton of dried paper. Polymers and enzymes are dissolved in water to make 2,500 ppm solutions prior to their additions to process water or stock.

Polymers

Synthetic white water used for testing was made by addition of several inorganic components (calcium chloride, sodium sulfate, and sodium acetate) and organic components (anionic starch, soluble lignin, sodium polyacrylate, sodium oleate, acetic acid and galactauronic acid). Conductivity of the resulting mixtures was within range of 4,700-5,000 uS/cm and pH within range of 6.1-6.3. Experiments were conducted on 250 or 500 g scale with a moderate mixing and temperatures close to 40-45° C. As a fiber source OCC "old corrugated containers" of 4% consistency was used. OCC was refined to 340 C.S.F. freeness before the use.

UV-VIS absorbance for all examples was done as follows. After the treatment, fiber slurries were filtered thorough 355 micron sieve and filtrates were diluted 10 fold and analyzed by UV-VIS spectrometry at 280 nm for soluble lignin content. Based on UV-VIS absorbance values % soluble lignin reductions were calculated.

Example 1

Testing was conducted in fiber/water slurry to imitate conditions of OCC thick stock treatment. Synthetic white water was made according to the recipe described above with the resulting conductivity of 4700 uS/cm and pH 6.2. To the synthetic white water, dewatered OCC fiber of 25% OD consistency was added in the amounts that the resulting consistency of fiber slurry was close to 4%. The amount of soluble lignin was measured in the thick stock and it was 300 ppm. Then the resulting fiber slurry was divided into four separate containers, treatments added and then slurries were placed in 45° C. bath and moderately mixed for 30 minutes. After the treatment fiber slurries were filtered thorough 355 micron sieve the filtrates were diluted 10 fold and analyzed by UV-VIS spectrometry at 280 nm for soluble lignin content. Based on UV-VIS absorbance values % lignin reductions were calculated.

Addition of laccase only (1 lb/ton) did not result in any significant changes in soluble lignin content (−1.0%), e.g. as shown in the results in Table 1 and FIG. 1. Addition of Perform PK2320 (1 lb/ton) Solenis LLC polymer product resulted in 39.3% reduction of lignin in soluble phase. Laccase treatment combined with addition of Perform PK2320 (1 lb/ton each) resulted in additional enhancement of lignin removal to 46.6%. The combination of polymer and laccase are synergistic in soluble lignin removal from soluble phase. As set forth below, Table 1 includes data related to removal of soluble lignin by application of laccase, Perform PK2320 polymer product and their combinations.

TABLE 1

| Treatment | Abs. @ 280 nm | % lignin removal |
|---|---|---|
| 1-1 No treatment | 0.582 | |
| 1-2 Laccase 1 lb/t | 0.587 | −1.0 |
| 1-3 PK2320, 1 lb/t | 0.353 | 39.3 |
| 1-4 Laccase/PK2320, 1 lb/t each | 0.311 | 46.6 |

Figure 2:
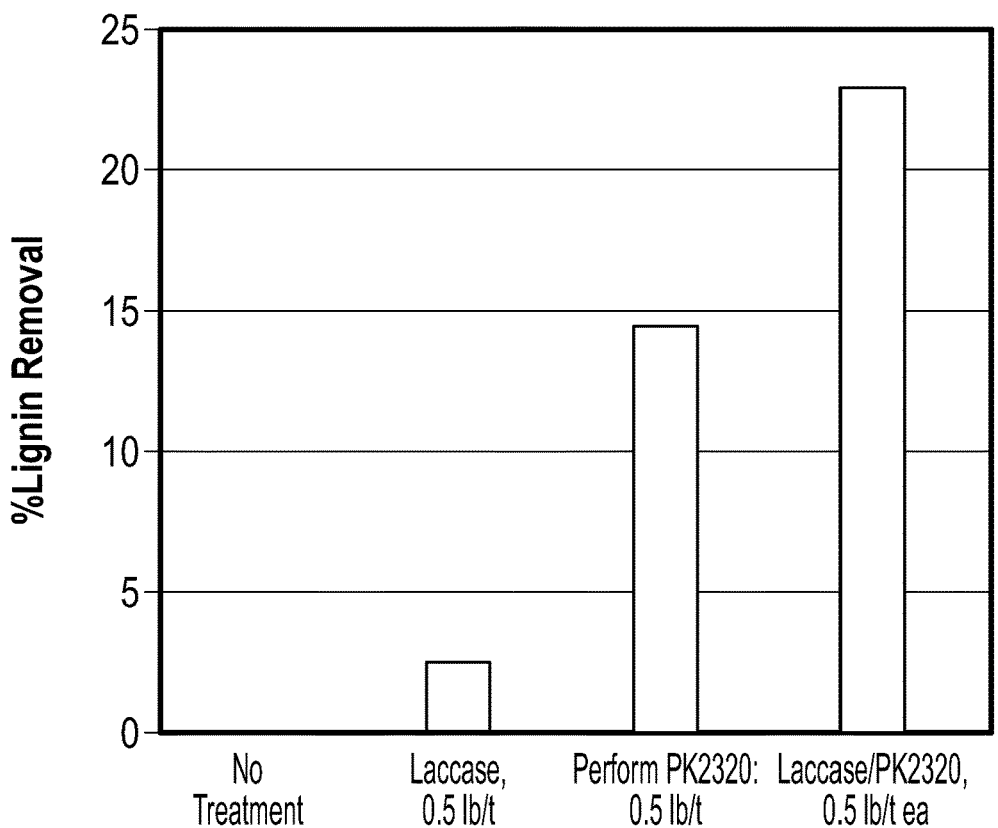
FIG. 2 is a graph depicting the removal of soluble lignin by application of laccase, Perform PK2320 polymer product and their combinations at low dosages.

Lignin removal enhancement is observed at lower laccase and polymer dosages as well. Table 2 and FIG. 2 describe lignin removal by laccase and Perform PK 2320 polymer at 0.5 lb/ton for both enzyme and polymer. As in the example above, addition of laccase only did not result in any significant reductions in soluble lignin (2.5%). Addition of 0.5 lb/ton of polymer product resulted in moderate 14.5% lignin removal. Application of laccase enzyme followed by polymer enhanced lignin removal to 23.0%. As set forth below, Table 2 includes data related to removal of soluble lignin by application of laccase, Perform PK2320 polymer product and their combinations at 0.5 lb/ton dosage

TABLE 2

| Treatment | Abs @ 280 nm | % Lignin reduction |
|---|---|---|
| 2-1 No treatment | 0.608 | |
| 2-2 Laccase 0.5 lb/t | 0.593 | 2.5 |
| 2-3 PK2320, 0.5 lb/t | 0.520 | 14.5 |
| 2-4 Laccase/PK2320, 0.5 lb/t each | 0.468 | 23.0 |

Example 2

Figure 3:
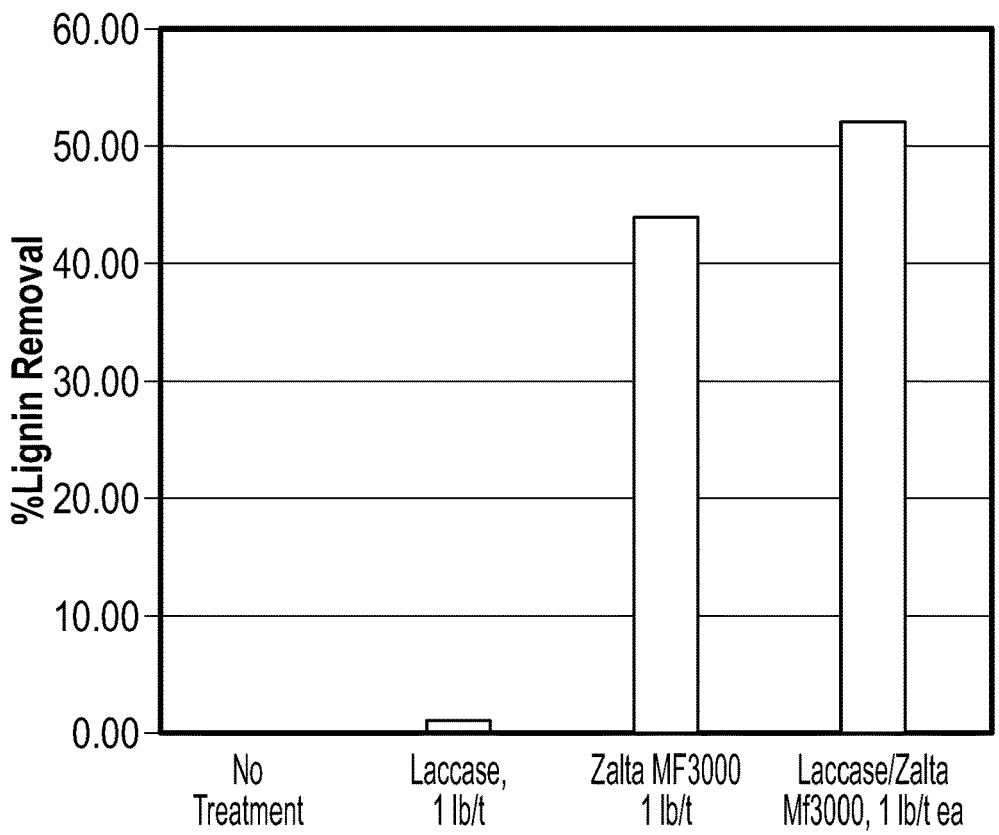
FIG. 3 is a graph depicting the removal of soluble lignin by application of laccase enzyme, Zalta MF300 polymer product and their combinations.

A combination of Zalta MF 3000 (high molecular weight polyethylene oxide, PEO dispersion product) and laccase was tested. Addition of laccase only (1 lb/ton) did not result in any significant changes in soluble lignin content (2.1%), see, e.g. results in Table 3 and FIG. 3. Addition of PEO polymer product (1 lb/ton) resulted in 44.2% reduction of lignin in soluble phase. Laccase treatment combined with addition of PEO polymer product (1 lb/ton each) resulted in additional enhancement of lignin removal to 52.1%. The combination of polyethylene oxide polymer and laccase enzyme are synergistic in lignin removal from soluble phase. As set forth below, Table 3 includes data related to removal of soluble lignin by application of laccase enzyme and Zalta MF3000 (polyethylene oxide) polymer product and their combination.

TABLE 3

| Treatment | Abs @ 280 nm | % Lignin reduction |
|---|---|---|
| 3-1 No treatment | 0.422 | |
| 3-2 Laccase, 1 lb/t each | 0.413 | 2.1 |
| 3-3 Zalta MF3000, 1 lb/t each | 0.235 | 44.3 |
| 3-4 Laccase/Zalta MF3000, 1 lb/t each | 0.202 | 52.1 |

Example 3

Figure 4:
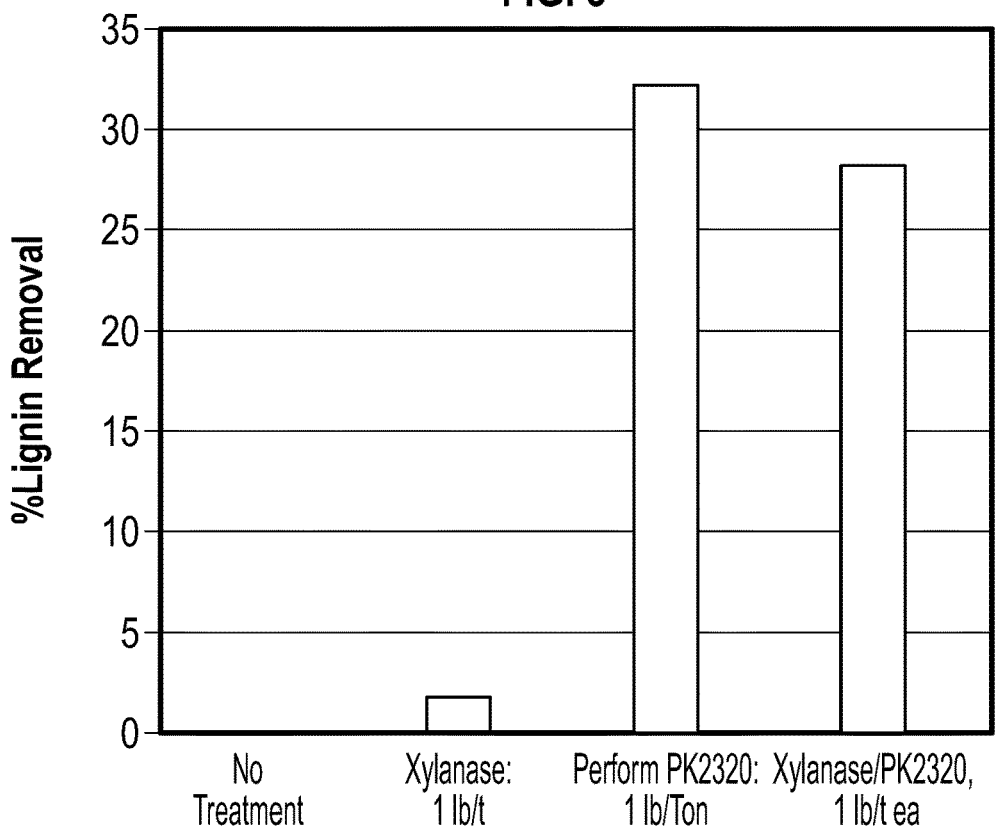
FIG. 4 is a graph depicting the removal of soluble lignin by application of xylanase and Perform PK 2320 and their combinations.

This experiment shows that the effect of laccase polymer is very specific and that other enzymes combined with various polymers do not work and do not enhance lignin removal. For example, the method of Example 1 was repeated except xylanase was used instead of laccase. As in Example 1 above, both enzyme and polymer were tested at 1 lb/ton. Addition of xylanase only (1 lb/ton) did not result in any significant changes in soluble lignin content, e.g. as shown in the results in Table 4 and FIG. 4. Addition of Perform PK2320 (1 lb/ton) polymer product resulted in 32% reduction of lignin in soluble phase. Xylanase treatment combined with addition of Perform PK2320 (1 lb/ton each) did not result in any additional enhancements of lignin removal. It dropped by 3.5% with xylanase addition. Xylanase did not help in removing soluble lignin from process water. Xylanase does not enhance lignin removal when combined with polymer. As set forth below, Table 4 includes data related to removal of soluble lignin by application of xylanase enzyme and PK2320 polymer product and their combination

TABLE 4

| Treatment | Abs @ 280 nm | % Lignin reduction |
| --- | --- | --- |
| 4-1 No treatment | 0.444 | |
| 4-2 Xylanase, 1 lb/ton | 0.437 | 1.6 |
| 4-3 Perform PK2320, 1 lb/ton | 0.302 | 32.1 |
| 4.4 Xylanase/PK2320, 1 lb/t each | 0.318 | 28.5 |

Example 4

White water from 100% closed RLB (recycled liner board) mill was used in Example 4. Dewatered OCC fiber was added to reach final cellulose fiber consistency close to 4%. Then, samples (500 g each) were placed in 45° C. bath for 30 minutes wherein half of the samples were treated with 0.25 lb/ton laccase enzyme followed by the addition of 1.0 lb/ton Perform PK 2320. Another half of samples was not treated with either enzyme or polymer. After 30 min, all samples were removed from the bath, cooled to room temperature and filtered through 355 micron filter. Filtrates were collected, analysed by UV-VIS at 280 nm and for Mutek charge, and then used in drainage tests. Results are set forth in Table 5 below.

Mutek charge was measured by Mutek PCD-02 Particle Charge Detector using polydadmac 0.001 mol/L solution as a titrant. Filtrates were diluted 5 fold before Mutek measurements.

The drainage activity of the disclosure was determined utilizing a Dynamic Drainage Analyzer, test equipment available from AB Akribi Kemikonsulter, Sundsvall, Sweden. The test device applies a 300 mbar vacuum to the bottom of the separation medium. The device electronically measures the time between the application of vacuum and the vacuum break point, i.e. the time at which the air/water interface passes through the thickening fiber mat. It reports this value as the drainage time. A lower drainage time is typical. 500 ml stock is added to the DDA and the drainage test is conducted at a total instrument vacuum of 300 mbar pressure.

Figure 5:
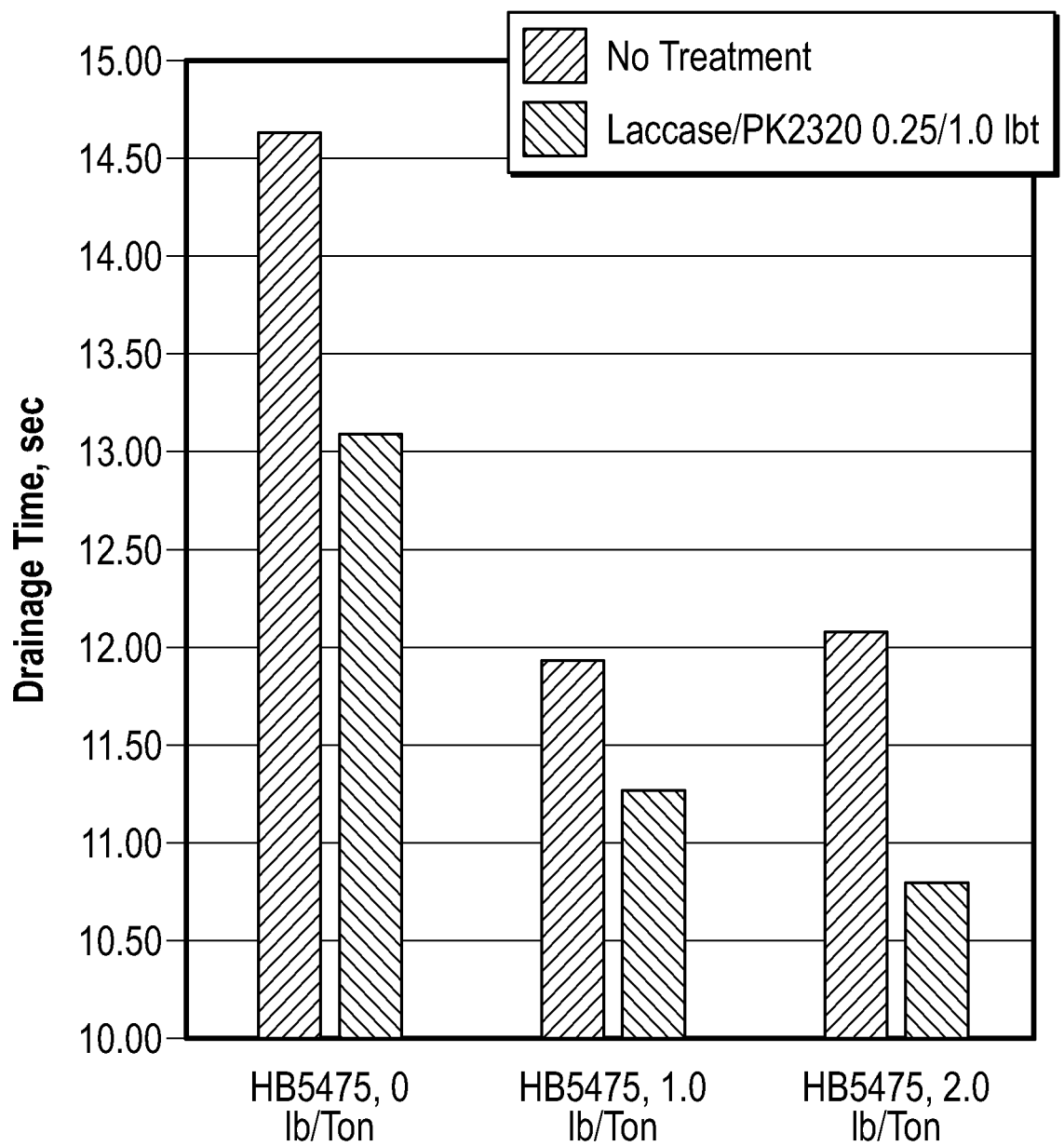
FIG. 5 is a graph depicting the drainage times with and without drainage aid Hercobond 5475 in treated (laccase/ Perform PK2320, 0.25/1.0 lb/ton added to thick stock) and non-treated filtrates.
Figure 6:
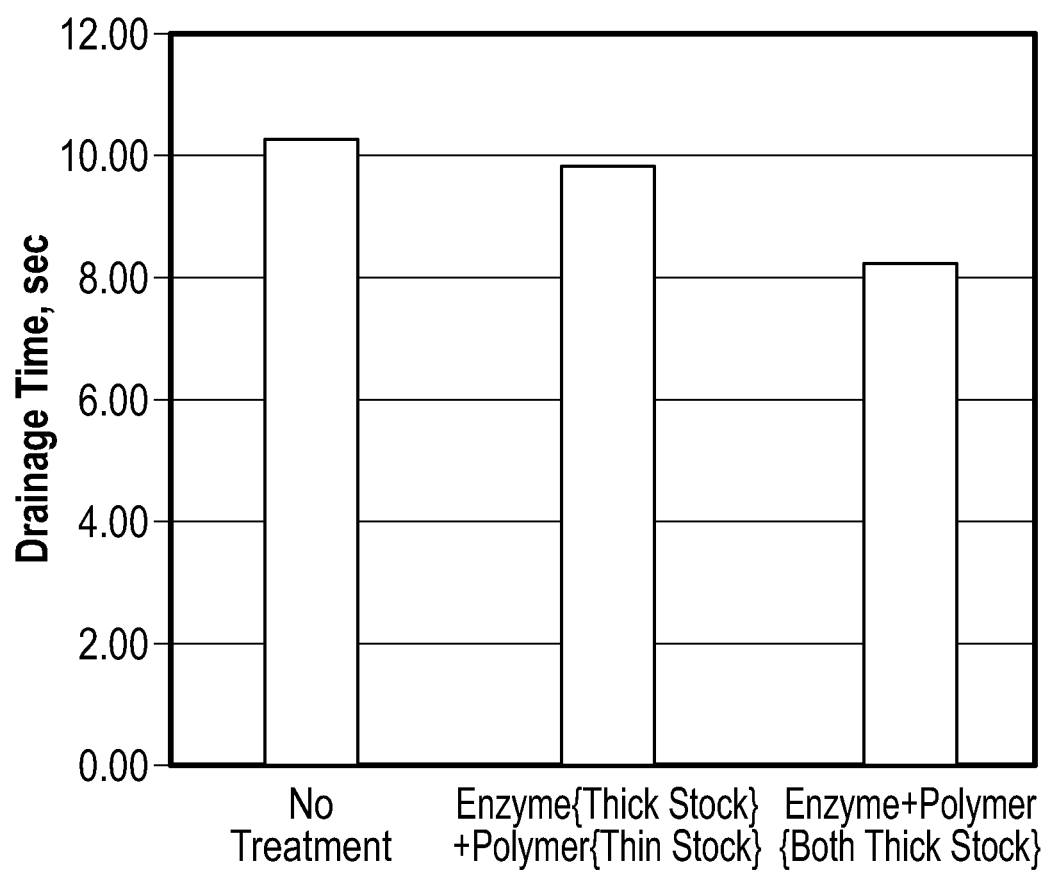
FIG. 6 is a graph depicting the Drainage testing data for samples with and without thick stock treatment with laccase/ polymer combination vs thick stock laccase pre-treatment followed by thin stock polymer treatment.

For drainage testing dewatered OCC fiber (25% consistency) was added to treated or non-treated white water filtrates to generate fiber/white water slurry of 0.7% consistency. Drainage tests was conducted with or without drainage aid, Hercobond 5475 (10% mole cationic polyacrylamide). Table 6 and FIG. 5 below summarize drainage test results.

Testing results indicate that white water treatment with enzyme and cationic polymer results in soluble lignin (Abs at 280 nm measured after 10 fold dilution) and negative Mutek charge declines (see results in Table 5) and finally to drainage time reductions (Table 6). The results also indicate that drainage times in original ("dirty") water do not change with an increase in drainage aid load from 1 to 2 lb/ton (see Table 6 and FIG. 5). Example 6-3 and 6-5 show approximate equal drainage with different drainage aid dosage. Contrast this to a treated system, treated examples 6-4 and 6-6 result in improved drainage and more efficient drainage aid. In treated mill water drainage times continue declining with increase in drainage polymer dosage from 1 to 2 lb/ton.

Moreover, in treated water the drainage time even with 1 lb/ton Hercobond 5475 is 11.28 sec and it is lower than drainage time with addition of 2 lb/ton of the same polymer to non-treated water, 12.08 sec. Therefore, efficiency of polymer aid increases with enzyme/polymer water treatment and drainage aid dosage can be reduced by 50% at least.

This data demonstrates the efficiency improvement of drainage aid Hercobond 5475 in white water from 100% closed recycle linerboard mill. Thick stock treatment with enzyme/polymer combination results in drainage times reductions, so that efficiency of polymer at 1 lb/ton in treated water exceeds the polymer performance in non-treated process water at 2 lb/ton level. As set forth below, Table 5 includes data related to soluble lignin and negative Mutek charge reductions in treated (laccase/Perform PK 2320, 0.25/1.0 lb/ton added to thick stock) vs non-treated filtrates

TABLE 5

| Sample | UV-VIS @ 280 nm | Mutek, uEq/l |
| --- | --- | --- |
| 5-1 Filtrate - Non treated | 1.418 | 1572.7 |
| 5-2 Filtrate - treated with Enzyme plus polymer | 1.244 | 1504.4 |

As set forth below, Table 6 includes data related to Hercobond 5475 in treated (laccase/Perform PK2320, 0.25/1.0 lb/ton added to thick stock) and non-treated filtrates.

TABLE 6

| 6-1 | Thick stock treatment | Drainage-thin stock | Drainage time, sec |
| --- | --- | --- | --- |
| 6-2 | No treatment | No treatment | 14.64 |
| 6-3 | Laccase/PK2320, 0.25/1.0 lb/ton | No treatment | 13.12 |
| 6-4 | No treatment | HB 5475, 1 lb/ton | 11.95 |
| 6-5 | Laccase/PK2320, 0.25/1.0 lb/ton | HB 5475, 1 lb/ton | 11.28 |
| 6-6 | No treatment | HB 5475, 2 lb/ton | 12.08 |
| 6-7 | Laccase/PK2320, 0.25/1.0 lb/ton | HB 5475, 2 lb/ton | 10.08 |

Example 5

Synthetic white water was used in this testing. Dewatered OCC fiber was added to white water to generate fiber/water consistency close to 4%. Then samples (500 g each) were placed in 45° C. bath for 30 minutes wherein some of the samples were not treated, others treated with 0.5 lb/ton laccase enzyme only, or 0.5 lb/ton laccase followed by the addition of 1.0 lb/ton Perform PK 2320. After 30 min, all samples were removed from the bath, cooled to room temperature and filtered through 355 micron filter. Filtrates were collected, analysed by UV-VIS at 280 nm and then used in drainage testing.

For drainage testing dewatered OCC fiber (25% consistency) was added to treated or non-treated white water filtrates to generate fiber/white water slurry of 0.7% consistency. Filtrates with enzyme only thick stock treatment were additionally treated with Perform PK2320 in the thin stock, 1 lb/ton prior to drainage testing. Drainage tests were conducted with or without drainage aid, Hercobond 5475.

Table 7 below summarizes drainage test results and UV-VIS data (of 10 fold diluted samples) at 280 nm for samples with and without thick stock treatment with laccase/polymer combination vs thick stock laccase treatment followed by thin stock polymer treatment

TABLE 7

| Thick stock pre-treatment | Thin stock treatment | Drainage - thin stock | Drainage time. sec | UV-Vis @ 280 nm |
|---|---|---|---|---|
| 7-1 No treatment | | No treatment | 15.03 | 0.435 |
| 7-2 No treatment | | HB 5475, 2 lb/ton | 10.2 | 0.435 |
| 7-3 Laccase, 0.5 lb/ton | PK 2320, 1 lb/ton | HB 5475, 2 lb/ton | 9.77 (4% improvement) | 0.461/0.365* |
| 7-4 Laccase/PK 2320 0.5/1.0 lb/ton | | HB 5475, 2 lb/ton | 8.18 (20% improvement) | 0.291 |

*0.461 measured in the thick stock, 0.365 measured in the thin stock

Testing data indicates that drainage times are the lowest with thick stock dual enzyme/polymer treatment. Thick stock enzyme treatment followed by addition of polymer to a thin stock is not as efficient: drainage times are higher. The same trend is observed in UV-VIS data. The highest decline in UV-VIS absorbance at 280 nm is recorded for filtrates with dual enzyme/polymer thick stock treatment. Enzyme treatment to the thick stock does not reduce UV-VIS absorbance: soluble lignin species do not decline with addition of laccase only (0.461 vs 0.435), even grow slightly.

Example 6

Synthetic white water was used in this testing. Dewatered OCC fiber was added to white water to generate thick stock consistency close to 4%. Then 500 g samples were placed in 45° C. bath for 30 min wherein some samples were not treated, others were treated with 1 lb/ton of Perform PK2320, or by 1 lb/ton laccase enzyme followed by 1 lb/ton Perform PK2320, and finally by 1.0 lb/ton laccase followed by 3.0 lb/ton Perform PK2320. After 30 min, all samples were removed from the bath, cooled to room temperature and filtered through a 355 micron filter. Filtrates were collected and analyzed by UV-VIS at 280 nm for soluble lignin determination. Additionally, filtrates were analyzed for COD content. Test results summarized in Table 8 below indicate that lignin reductions with Enzyme+Polymer thick stock treatment translate into additional 8 to 10% reductions in COD content of white water.

TABLE 8

| Treatment | Abs @280 nm | % Lignin Reduction | COD (ppm) | % COD Red-n | COD (ppm) ANA Treat. | % COD Red-n (ANA Treat.) |
|---|---|---|---|---|---|---|
| No Treatment | 0.666 | — | 4850 | — | 1490 | — |
| PK2320, 1.0 lbt | 0.444 | 33% | 4795 | 1.1 | 1080 | 27.5 |
| Laccase/ PK2320 1.0/1.0 | 0.427 | 36% | 4440 | 8.5 | 728 | 51.1 |
| Laccase/ PK2320 1.0/3.0 | 0.248 | 63% | 4345 | 10.4 | 749 | 49.7 |

Then, the same filtrates were charged with anaerobic sludge and nutrients and placed in a 40° C. bath for 8 days to imitate the conditions of anaerobic digester plant treatment. After 8 days, filtrate samples were collected and their COD contents were re-analyzed. Analyses done after anaerobic treatment demonstrate further reductions in COD of filtrates. In this case enzyme and polymer treated samples included about 50% less COD as compared "No treatment" samples. Enzyme and polymer thick stock treatment facilitates reduction in COD content by soluble lignin removal and provides significant advantage in COD removal (50% more decline) when anaerobic digester treatment is utilized.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

Moreover, all individual components, method steps, conditions, physical properties, etc. that are described above are hereby expressly contemplated for use together in one or more non-limiting embodiments even though they may not be described together above. In other words, all combinations of the aforementioned components, method steps, conditions, physical properties, etc. are hereby expressly contemplated for use in various non-limiting embodiments.

What is claimed is:

1. A method of increasing chemical efficiency of chemical additives in a papermaking system, said method comprising the steps of:
   providing thick stock pulp comprising soluble lignin, process water, and at least 2% by weight of cellulosic fiber based on total weight of thick stock pulp, and
   adding at least one laccase enzyme and at least one organic polymer chosen from the group consisting of cationic polyacrylamides, polyethyleneoxides, and combinations thereof, to the thick stock pulp to reduce the amount of soluble lignin therein;
   wherein the at least one laccase enzyme is present in an amount of from 0.1 to 1 pound actives per ton of oven dried pulp and the at least one organic polymer is present in an amount of from 0.5 to 3 pounds actives per ton of oven dried pulp.

2. The method of claim 1 wherein the thick stock pulp comprises at least 3% by weight of the cellulosic fibers based on a total weight of the thick stock pulp and wherein the cellulosic fibers are derived from NSSC pulp, OCC pulp, deinked pulp, virgin fiber, mechanical pulp, unbleached Kraft pulp or combinations thereof.

3. The method of claim 1 wherein the cationic polyacrylamide is derived from at least one monomer chosen from diallyldimethylammonium chloride, N,N,N-trialkylamminoalkyl (meth)acrylate, N,N,N-trialkylamminoalkyl (meth) acrylamide, epichlorohydrin-dimethylamine and combinations thereof.

4. The method of claim 1 wherein the organic polymer is a polymer dispersion.

5. The method of claim 1 wherein the weight average molecular weight of the organic polymer is from 100,000 to 10 million Da.

6. The method of claim 1 wherein the organic polymer has a weight average molecular weight of from 1,000,000 to 10,000,000 Da.

7. The method of claim 1 wherein the organic polymer is the polyethyleneoxide polymer having a weight average molecular weight of greater than 1,000,000 and less than 10 million Da.

8. The method of claim 1 wherein the organic polymer is the cationic polyacrylamide having a weight average molecular weight of greater than 200,000 and less than 10 million Da.

9. The method of claim 1 wherein the reduction in the amount of soluble lignin in the process water is evidenced by at least a 5% reduction in absorbance in a UV-VIS spectra measured at 280 nm after 24 hours as compared to process water that is free of the at least one laccase enzyme and the at least one organic polymer and/or the process water exhibits a chemical oxygen demand that is reduced by at least 5% as compared to the chemical oxygen demand of process water that is free of the at least one laccase enzyme and the at least one organic polymer.

10. The method of claim 1 further comprising the step of adding an inorganic coagulant to the process water wherein the inorganic coagulant is chosen from aluminum sulfate, aluminum chloride, aluminum chlorohydrate, polyaluminum chloride, polyaluminum sulfate, iron (III) chloride, iron (III) sulfate, iron (II) chloride, iron (II) sulfate, polyferrous sulfate, and combinations thereof.

11. The method of claim 1 wherein the cationic polyacrylamide is a water dispersion and is present in an amount of from 0.5 to 1 pound of actives per ton of oven dried pulp.

12. The method of claim 1 wherein the laccase enzyme is present in an amount of from 0.5 to 1 pound of actives per ton of oven dried pulp.

13. The method of claim 1 wherein the cationic polyacrylamide and the laccase enzyme are present in a weight ratio of from 1:1 to 10:1 based on weight of actives.

14. The method of claim 1 wherein the cationic polyacrylamide and the laccase enzyme are present in a weight ratio of 1:1 based on weight of actives.

15. The method of claim 1 wherein the cationic polyacrylamide and the laccase enzyme are present in a weight ratio of 4:1 based on weight of actives.

16. The method of claim 1 wherein the cationic polyacrylamide and the laccase enzyme are present in a weight ratio of 3:1 based on weight of actives.

17. The method of claim 1 wherein the cationic polyacrylamide and the laccase enzyme are present in a weight ratio of 2:1 based on weight of actives.

18. The method of claim 1 wherein the polyethyleneoxide and the laccase enzyme are present in a weight ratio of 1:1 to 10:1 based on weight of actives.

19. The method of claim 1 further comprising the step of adding a drainage aid to the thick stock pulp to achieve a drainage time that is less than a drainage time achieved by a comparable thick stock pulp that also includes the drainage aid but that is free of the at least one laccase enzyme and at least one organic polymer, wherein the drainage aid is present in the thick stock pulp in an amount that is at least 50% less than an amount of the drainage aid in the comparable thick stock pulp based on weight of actives.

20. A method of increasing chemical efficiency of chemical additives in a papermaking system, said method comprising the steps of:
providing thick stock pulp comprising soluble lignin, process water, and at least 3% by weight of cellulosic fiber based on total weight of thick stock pulp, wherein the cellulosic fibers are derived from NSSC pulp, OCC pulp, deinked pulp, virgin fiber, mechanical pulp, unbleached Kraft pulp or combinations thereof, and
adding at least one laccase enzyme and at least one cationic polyacrylamide that is a water dispersion to the thick stock pulp to reduce the amount of soluble lignin therein;
wherein the at least one laccase enzyme is present in an amount of from 0.1 to 1 pound actives per ton of oven dried pulp dried furnish solids and the at least one organic polymer is present in an amount of from 0.5 to 3 pounds actives per ton of oven dried pulp.

* * * * *